United States Patent
Ben-Natan et al.

(10) Patent No.: US 7,970,788 B2
(45) Date of Patent: Jun. 28, 2011

(54) SELECTIVE LOCAL DATABASE ACCESS RESTRICTION

(75) Inventors: Ron Ben-Natan, Lexington, MA (US); Izar Tarandach, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 11/195,387

(22) Filed: Aug. 2, 2005

(65) Prior Publication Data
US 2010/0131512 A1    May 27, 2010

(51) Int. Cl.
*G06F 17/30* (2006.01)
(52) U.S. Cl. ...................................... 707/782
(58) Field of Classification Search .................. 707/782
See application file for complete search history.

(56) References Cited

U.S. PATENT DOCUMENTS

| | | | |
|---|---|---|---|
| 4,451,916 A | 5/1984 | Casper et al. | |
| 4,611,205 A | 9/1986 | Eglise | |
| 4,672,572 A | 6/1987 | Alsberg | |
| 4,956,769 A | 9/1990 | Smith | |
| 5,224,058 A | 6/1993 | Mickaels | |
| 5,261,102 A | 11/1993 | Hoffman | |
| 5,299,257 A | 3/1994 | Fuller et al. | |
| 5,325,290 A | 6/1994 | Cauffman et al. | |
| 5,355,474 A | 10/1994 | Thuraisngham et al. | |
| 5,557,742 A | 9/1996 | Smaha et al. | |
| 5,594,899 A * | 1/1997 | Knudsen et al. | 707/2 |
| 5,606,668 A | 2/1997 | Shwed | |
| 5,701,342 A | 12/1997 | Anderson et al. | |
| 5,737,316 A | 4/1998 | Lee | |
| 5,758,083 A | 5/1998 | Singh et al. | |
| 5,825,772 A | 10/1998 | Dobbins et al. | |
| 5,826,267 A | 10/1998 | McMillan | |
| 5,828,666 A * | 10/1998 | Focsaneanu et al. | 370/389 |
| 5,835,726 A | 11/1998 | Shwed et al. | |
| 5,845,281 A | 12/1998 | Benson et al. | |
| 5,848,233 A | 12/1998 | Radia et al. | |
| 5,881,225 A | 3/1999 | Worth | |
| 5,884,025 A | 3/1999 | Baehr et al. | |
| 5,953,707 A | 9/1999 | Huang et al. | |
| 5,963,642 A | 10/1999 | Goldstein | |
| 5,974,396 A | 10/1999 | Anderson et al. | |

(Continued)

FOREIGN PATENT DOCUMENTS

EP      0398645      11/1990

(Continued)

OTHER PUBLICATIONS

Lunt et al., "IDES: A Progress Report," IEEE, 1990.

(Continued)

*Primary Examiner* — Mark A Radtke
(74) *Attorney, Agent, or Firm* — Terry J. Carroll; Edell, Shapiro & Finnan, LLC

(57) ABSTRACT

A nonintrusive database access monitoring mechanism employs a hybrid approach that disallows, or blocks, the access mediums which are not feasible to intercept or analyze, as well as intercepting and analyzing access mediums for which interception and interrogation is available. Accordingly, various configurations provide the hybrid coverage approach to identifying access mediums, and either block or intercept the access attempts. In this manner, access mediums, such as interprocess communication (IPC) system calls, which may be efficiently intercepted and analyzed are captured and substantively processed, while other access mediums that are excessively burdensome or intrusive to capture are unselectively blocked from any communication, avoiding the need to analyze such access attempts.

31 Claims, 9 Drawing Sheets

U.S. PATENT DOCUMENTS

| | | | |
|---|---|---|---|
| 5,978,788 A | 11/1999 | Castelli et al. | |
| 5,978,813 A * | 11/1999 | Foltz et al. | 707/201 |
| 6,009,475 A | 12/1999 | Shrader | |
| 6,016,491 A | 1/2000 | Kou | |
| 6,044,376 A | 3/2000 | Kurtzman, II | |
| 6,049,821 A | 4/2000 | Theriault et al. | |
| 6,052,447 A | 4/2000 | Golden et al. | |
| 6,061,797 A | 5/2000 | Jade et al. | |
| 6,070,243 A | 5/2000 | See et al. | |
| 6,075,926 A | 6/2000 | Atkins et al. | |
| 6,076,168 A | 6/2000 | Fiveash et al. | |
| 6,081,900 A | 6/2000 | Subramaniam et al. | |
| 6,085,191 A * | 7/2000 | Fisher et al. | 707/9 |
| 6,088,796 A | 7/2000 | Cianfrocca et al. | |
| 6,097,399 A | 8/2000 | Bhatt et al. | |
| 6,105,027 A * | 8/2000 | Schneider et al. | 707/9 |
| 6,119,236 A | 9/2000 | Shipley | |
| 6,122,403 A | 9/2000 | Rhoads | |
| 6,125,447 A | 9/2000 | Gong | |
| 6,151,601 A | 11/2000 | Papierniak et al. | |
| 6,192,476 B1 | 2/2001 | Gong | |
| 6,205,475 B1 | 3/2001 | Pitts | |
| 6,226,749 B1 | 5/2001 | Carloganu et al. | |
| 6,230,156 B1 | 5/2001 | Hussey | |
| 6,236,996 B1 | 5/2001 | Bapat et al. | |
| 6,253,321 B1 | 6/2001 | Nikander et al. | |
| 6,272,641 B1 | 8/2001 | Ji | |
| 6,279,010 B1 | 8/2001 | Anderson | |
| 6,298,327 B1 | 10/2001 | Hunter et al. | |
| 6,304,975 B1 | 10/2001 | Shipley | |
| 6,311,272 B1 | 10/2001 | Gressel | |
| 6,330,562 B1 * | 12/2001 | Boden et al. | 707/10 |
| 6,332,163 B1 | 12/2001 | Bowman-Amuah | |
| 6,336,996 B1 * | 1/2002 | Steiner | 162/193 |
| 6,341,312 B1 * | 1/2002 | French et al. | 709/227 |
| 6,347,374 B1 | 2/2002 | Drake et al. | |
| 6,347,376 B1 | 2/2002 | Attwood et al. | |
| 6,356,941 B1 | 3/2002 | Cohen | |
| 6,366,952 B2 | 4/2002 | Pitts | |
| 6,393,568 B1 | 5/2002 | Ranger et al. | |
| 6,442,748 B1 * | 8/2002 | Bowman-Amuah | 717/108 |
| 6,460,046 B1 | 10/2002 | Meek | |
| 6,480,861 B1 | 11/2002 | Kanevsky et al. | |
| 6,496,850 B1 * | 12/2002 | Bowman-Amuah | 709/203 |
| 6,505,241 B2 | 1/2003 | Pitts | |
| 6,529,909 B1 * | 3/2003 | Bowman-Amuah | 707/10 |
| 6,529,948 B1 | 3/2003 | Bowman-Amuah | |
| 6,532,465 B2 | 3/2003 | Hartley et al. | |
| 6,539,396 B1 | 3/2003 | Bowman-Amuah | |
| 6,550,057 B1 | 4/2003 | Bowman-Amuah | |
| 6,578,068 B1 | 6/2003 | Bowman-Amuah | |
| 6,581,052 B1 | 6/2003 | Slutz | |
| 6,601,192 B1 | 7/2003 | Bowman-Amuah | |
| 6,606,660 B1 | 8/2003 | Bowman-Amuah | |
| 6,609,123 B1 | 8/2003 | Cazemier et al. | |
| 6,615,253 B1 | 9/2003 | Bowman-Amuah | |
| 6,633,936 B1 | 10/2003 | Keller et al. | |
| 6,636,585 B2 | 10/2003 | Salzberg et al. | |
| 6,658,091 B1 | 12/2003 | Naidoo et al. | |
| 6,658,625 B1 | 12/2003 | Allen | |
| 6,678,355 B2 | 1/2004 | Eringis al. | |
| 6,681,331 B1 | 1/2004 | Munson et al. | |
| 6,687,702 B2 | 2/2004 | Vaitheeswaran et al. | |
| 6,694,368 B1 * | 2/2004 | An et al. | 709/227 |
| 6,714,778 B2 | 3/2004 | Nykanen et al. | |
| 6,789,046 B1 | 9/2004 | Murstein et al. | |
| 6,807,546 B2 * | 10/2004 | Young-Lai | 707/102 |
| 6,820,082 B1 | 11/2004 | Cook et al. | |
| 6,842,105 B1 | 1/2005 | Henderson et al. | |
| 6,851,004 B2 | 2/2005 | Keller et al. | |
| 6,941,369 B1 | 9/2005 | Krack et al. | |
| 6,941,472 B2 * | 9/2005 | Moriconi et al. | 726/11 |
| 7,038,611 B2 * | 5/2006 | Gounalis | 342/13 |
| 7,043,541 B1 | 5/2006 | Bechtolsheim et al. | |
| 7,080,077 B2 * | 7/2006 | Ramamurthy et al. | 707/9 |
| 7,085,834 B2 * | 8/2006 | Delany et al. | 709/225 |
| 7,089,322 B1 | 8/2006 | Stallmann | |
| 7,111,059 B1 | 9/2006 | Garcea et al. | |
| 7,171,413 B2 | 1/2007 | Puz et al. | |
| 7,231,378 B2 * | 6/2007 | Lawson et al. | 707/2 |
| 7,248,568 B1 * | 7/2007 | Loc et al. | 370/312 |
| 7,308,388 B2 * | 12/2007 | Beverina et al. | 703/6 |
| 7,337,105 B2 * | 2/2008 | Sugimoto | 704/9 |
| 7,342,896 B2 * | 3/2008 | Ayyagari | 370/254 |
| 7,426,512 B1 * | 9/2008 | Ben-Natan | 707/9 |
| 7,437,362 B1 * | 10/2008 | Ben-Natan | 707/9 |
| 7,506,371 B1 | 3/2009 | Ben-Natan | |
| 7,567,819 B2 * | 7/2009 | Alone et al. | 455/552.1 |
| 2002/0007363 A1 | 1/2002 | Vaitzblit | 707/202 |
| 2002/0010800 A1 | 1/2002 | Riley et al. | |
| 2002/0019944 A1 | 2/2002 | Kou | |
| 2002/0027907 A1 | 3/2002 | Tateoka | |
| 2002/0059451 A1 | 5/2002 | Haviv | |
| 2002/0066033 A1 | 5/2002 | Dobbins et al. | |
| 2002/0066038 A1 | 5/2002 | Mattsson et al. | |
| 2002/0078384 A1 | 6/2002 | Hippelainen | |
| 2002/0095496 A1 | 7/2002 | Antes et al. | |
| 2002/0095603 A1 | 7/2002 | Godwin et al. | |
| 2002/0104017 A1 | 8/2002 | Stefan | |
| 2002/0129140 A1 | 9/2002 | Peled et al. | |
| 2002/0129271 A1 | 9/2002 | Stanaway et al. | |
| 2002/0133723 A1 | 9/2002 | Tait | |
| 2002/0147726 A1 | 10/2002 | Yehia et al. | |
| 2002/0147927 A1 | 10/2002 | Tait | |
| 2002/0152399 A1 | 10/2002 | Smith | |
| 2002/0154646 A1 | 10/2002 | Dubois et al. | |
| 2002/0157020 A1 | 10/2002 | Royer | |
| 2002/0177910 A1 | 11/2002 | Quarterman et al. | |
| 2003/0028624 A1 | 2/2003 | Hasan et al. | |
| 2003/0046302 A1 | 3/2003 | Miron | |
| 2003/0056200 A1 | 3/2003 | Li et al. | |
| 2003/0084320 A1 | 5/2003 | Tarquini et al. | |
| 2003/0084328 A1 | 5/2003 | Tarquini et al. | |
| 2003/0182580 A1 | 9/2003 | Lee | |
| 2003/0217069 A1 | 11/2003 | Fagin et al. | |
| 2004/0024764 A1 * | 2/2004 | Hsu et al. | 707/9 |
| 2004/0093506 A1 | 5/2004 | Grawrock et al. | |
| 2004/0111344 A1 | 6/2004 | Fetter et al. | |
| 2004/0111623 A1 | 6/2004 | Miller et al. | |
| 2004/0117037 A1 | 6/2004 | Hinshaw et al. | |
| 2004/0143733 A1 | 7/2004 | Ophir et al. | |
| 2004/0255301 A1 | 12/2004 | Turski et al. | |
| 2004/0260947 A1 | 12/2004 | Brady et al. | |
| 2005/0005031 A1 | 1/2005 | Gordy et al. | |
| 2005/0071650 A1 | 3/2005 | Jo et al. | |
| 2005/0086529 A1 | 4/2005 | Buchsbaum | |
| 2005/0097149 A1 | 5/2005 | Vaitzblit et al. | 707/202 |
| 2005/0149537 A1 | 7/2005 | Balin et al. | |
| 2005/0203921 A1 | 9/2005 | Newman et al. | |
| 2006/0059154 A1 | 3/2006 | Raab | |
| 2006/0242431 A1 | 10/2006 | LeCrone et al. | |
| 2007/0112864 A1 | 5/2007 | Ben-Natan | |
| 2007/0180275 A1 | 8/2007 | Metzger et al. | |
| 2008/0011843 A1 * | 1/2008 | Barenburg et al. | 235/385 |
| 2009/0271453 A1 | 10/2009 | Ben-Natan | |
| 2010/0131758 A1 | 5/2010 | Ben-Natan | |
| 2010/0132024 A1 | 5/2010 | Ben-Natan et al. | |

FOREIGN PATENT DOCUMENTS

| | | |
|---|---|---|
| WO | 98/31124 A1 | 7/1998 |
| WO | 99/66384 A2 | 12/1999 |

OTHER PUBLICATIONS

Jones Katherine, "Secure Internet Access to SAP's R/3: Keeping Dragons Out," Int. J. Network Mgmt., vol. 8 © 1998, pp. 191-199.

Joshi, James B. D., et al., "Security Models for Web-Based Applications," Communications of the ACM, vol. 44, No. 2, Feb. 2001, pp. 38-44.

Muller, Nathan J., "Improving Network Operations With Intelligent Agents," Int. J. Network Mgmt., vol. 7, © 1997, pp. 116-126.

Jaeger, T., et al., "Flexible Access Control Using IPC Redirection," Proc. of the 7th Workshop on Hot Topics in Operating Systems, Mar. 29-30, 1999, pp. 191-196.

Roscheisen, Martin, et al., "A Communication Agreement Framework for Access/Action Control," 1996 IEEE Symposium on Security and Privacy, © 1996, pp. 154-163.

Appenzeller, Guido, et al., "User-Friendly Access Control for Public Network Ports," IEEE 0-7803-5417-6/99, ©1999, pp. 699-707.

Balasubramaniyan, Jai Sundar, et al., "An Architecture for Intrusion Detection Using Autonomous Agents," 14th Annual Computer Security Applications Conf. Proc., Phoenix, AZ, Dec. 7-11, 1998, pp. 13-24.

Gangadharan, Muralidaran, et al., "Intranet Security with Micro-Firewalls and Mobile Agents for Proactive Intrusion Response," IEEE Int'l Conf. on Computer Networks and Mobile Computing, Beijing, China, Oct. 16-19, 2001, pp. 325-332.

Miller, Sandra Kay, "The Trusted OS Makes a Comeback," Computer, vol. 34, Issue 2, Feb. 2001, pp. 16-19.

Microsoft Computer Dictionary, 5th Edition, Microsoft Press, Redmond WA, © 2002, p. 22.

Chari, Suresh N., et al., "BlueBoX: A Policy-Driven, Host-Based Intrusion Detection System," ACM Transactions on Information and System Security, vol. 6, No. 2, May 2003, pp. 173-200.

Schepers, Filip, et al., "Network-Versus Host-Based Intrusion Detection," Information Security Technical Report, vol. 3, Issue 4, ©1998, pp. 32-42.

Levine, John, et al., "The Use of Honeynets to Detect Exploited Systems Across Large Enterprise Networks," Proc. of the 2003 IEEE Workshop on Information Assurance, West Point, NY, Jun. 18-20, 2003, pp. 92-99.

Kewley, Dorene L., et al., "DARPA Information Assurance Program Dynamic Defense Experiment Summary," IEEE Transactions on Systems, Man and Cybernetics—Part A: Systems and Humans, vol. 31, No. 4, Jul. 2001, pp. 331-336.

Ron Ben Natan, Implementing Database Security and Auditing: A Guide for DBAs, information security administrators and auditors, Elsevier Digital Press (May 2, 2005) pp. 95-108, 177-201, 242-266, 278-293, 324-326, 340-391.

Newman, Aaron, Security Auditing in Microsoft SQL Server (Nov. 3, 2005) [retrieved from http://web.archive.org./web/20051227161250/www.appsecinc./presentations/Security_Auditing_MSSQL.pdf on Apr. 6, 2010].

Applicaton Security, Inc. AppRadar User Guide (Nov. 3, 2005) [retrieved from http://web.archive.org.web/20050204172218/http://www/appsecinc.com/techdocs/AppDetectiveUG.pdf on Apr. 5, 2010].

Guardium Press Release, "Guardium Introduces SQL Guard" (Feb. 9, 2004) [retrived from http://www.guardium.com/index.php/prprint/390 on Mar. 19, 2010].

Webster's II New College Dictionary. Houghton Mifflin Co. (1995). p. 231.

Deri, L; Carbone R; Suin, S. Monitoring Networks Using Ntop (2001) [Retrieved from http://citeseer.ist.psu.edu/old/414959.html on Apr. 7, 2010].

Roesch, Martin. Snort- Lightweight Intrusion Detection for Networks. Proceedings of LISA '99 13th Systems Administration Conference (Nov. 7-12, 1999) pp. 229-238 [retrieved from http://www.unenix.org on Apr. 6, 2010].

Silberzchatz, A; Korth, H.; Sudarshan, S. Database System Concept. 5th Edition. McGraw-Hill Publishing (May 17, 2005) pp. 934-936, 1078-1079.

Guardium, Inc. Auditing, Compliance, and Privacy Through Effective Controls on Data Access and Usage (Mar. 22, 2005) [retrieved from http://guardium.com on Apr. 6, 2010].

Dar et al., "dbSwitchtm: towards a database utility," Proceedings of the 2004 ACM SIGMOD international conference on Management of data, Jun. 2004 p. 892-896. Retrived from the Internet <URL:http//portal.acm.org/ft_gateway.cfm? id=1005726&type=pdf &coll=ACM&CFID=59243114&CFTOKEN=20435778>.

Feamster et al., "A model of BGP routing for network engineering," Proceedings of the joint international conference on Meaurement and Modeling of computer systems, Jun. 2004, p. 331-342. Retrieved from the internet:URL: http://portal.acm.org/ft_gateway.cfm?id=1005726&type=pdf&coll=ACM&d1=ACM &CFID=59243114&CFTOKEN=20435778>.

SQL Guard Version 4.0.2 User Guide, Aug. 18, 2005.

SQL Guard Version 4.0.2 Administrator Guide, Aug. 18, 2005.

User Guide for SQL Guard Version 5.1, Jul. 14, 2006.

Administrator Guide for SQL Guard Version 5.1, Jul. 21, 2006.

Rao et al., "A New Neural Network Acrhitecture for Efficient Close Proximity Match of Large Databases", Database and Expert Systems Applications, 1997, Proceedings Eighth International Workshop Toulouse, France, Sep. 1-2, 1997, IEEE Comput. Soc. Sep. 1, 1997, pp. 444-449.

* cited by examiner

SELECTIVE LOCAL DATABASE ACCESS RESTRICTION

BACKGROUND

In a managed information environment, users typically access a mass storage subsystem, such as one or more databases (DBs) for various data items used in the normal course of operations. Often, it is desirable to monitor and oversee transactions occurring with respect to data base access. Monitoring the databases access transactions can identify potential security breaches, inappropriate usage of sensitive information, track usage trends to assist with resource planning and accounting chargebacks, and provide continuous tracking of access to sensitive data for government mandated auditing and regulatory compliance.

In modern managed information environments, database security is a growing concern. With the increasing availability of computing power and mass storage, many corporations are maintaining larger data stores of sensitive or confidential information. Such information includes not only intrinsic proprietary corporate data, but also data external to the corporation, such as customer account information, names, addresses, credit card and bank account information, etc. At the same time, public awareness about privacy and the responsibility of entrusted entities to safeguard the information entrusted to them increases. Accordingly, database operators strive to maintain transaction monitoring, access control, and audit trail recording over such a database repository.

Database security and monitoring mechanisms can impose a substantial processing burden on the systems they monitor. Performance and throughput can be detrimentally affected by security mechanisms which intercede in every database access for security processing and transaction logging. However, nonintrusive database security mechanisms can mitigate this overhead. Nonintrusive database monitoring avoids burdening the database server with the transactional gathering associated with monitoring and controlling the database access attempts. Rather, the interception and collection of database access attempts (transactions) is offloaded to a separate computing device, or collector.

Accordingly, some systems employ nonintrusive data level database access monitoring techniques. Nonintrusive access monitoring resides in a separate computing device in communication with an access path, such as an Ethernet cable, between the users and the database server. Such nonintrusive devices observe database access requests (transactions) in a passive manner during transport from the user to the database server. Accordingly, a database monitor device passively intercepts these transactions in a nonintrusive manner from an access network, a technique sometimes referred to as "sniffing." Accordingly, a database monitor and access control framework may gather the database transactional data via an offloaded processor which does not impede database access or compete with database servers for available CPU cycles.

SUMMARY

Conventional network-based security techniques identify and scrutinize each access path from a network to a protected resource, such as a server, VPN, or database. Exclusive perimeter or network access point-based approaches may not be entirely appropriate for all installations. With respect to database security, conventional perimeter access control mechanisms may not address local access that does not employ the network, or that otherwise avoids network based access controls (e.g. an encrypted SSH connection). For example, a conventional database security mechanism which monitors Internet connections may not be effective against an unscrupulous operator using a local privileged account. Configurations of the invention are based, in part, on the observation that conventional non-intrusive database security measures may need to account for each available potential local access path, in addition to analyzing each remote access connection (i.e. SQL over the wire). The local access paths may potentially be employed, for example, to circumvent perimeter access (or other external connection monitoring) protection provided by a network access monitoring approach that covers remote access attempts. Accordingly, a more robust security approach covers all available local access mediums, as well as remote connections.

Such local access mediums typically employ an InterProcess Communication (IPC) mechanism inherent in the operating system of the particular database server. Such IPC mechanisms may include, for example, shared memory, sockets, Unix pipes, Windows LPC (Windows specific) and Named pipes. Other mediums may be available depending on the hardware and OS employed. Protecting the database against unauthorized or malicious local access includes covering the available IPC or other local access mediums with a selective access mechanism as discussed further below. Typically, such coverage includes identifying system calls which employ the IPC mechanism for DB access, and intercepting the access attempt to analyze it for suspect activity. On particular systems, however, it may be overly intrusive or burdensome to intercept the system calls or other access medium underlying the local access mechanism.

Accordingly, configurations discussed herein substantially overcome the shortcomings with conventional perimeter schemes by employing a hybrid approach that disallows, or blocks, the access mediums which are not feasible to intercept or analyze, as well as intercepting and analyzing access mediums for which interception and interrogation is available. Accordingly, configurations herein provide the hybrid coverage approach to identifying access mediums, and either block or intercept the access attempts. In this manner, access mediums, such as IPC system calls, which may be efficiently intercepted and analyzed are captured and substantively processed, while other access mediums that are excessively burdensome or intrusive to capture are unselectively blocked from any communication, avoiding the need to analyze such access attempts.

In the exemplary arrangement discussed herein, a local nonintrusive access monitoring mechanism complements a remote access nonintrusive monitoring mechanism for protecting a database. The local monitoring mechanism monitors database access attempts performed on the local server, as opposed to remote access via a network connected to the database server. Local access monitoring and control is achieved by accessing the interprocess communication mechanism (IPC) employed by the operating system (OS) for local access to the database. Typically, the IPC mechanism employs file structures or shared memory via system calls to the operating system from the requesting processes. Monitoring and/or analyzing these requests involves intercepting and collecting the system service calls. The nonintrusive access monitoring application may then perform substantive analysis. However, typical operating systems often have multiple system calls, or access paths, employable via the IPC mechanisms. Protection, therefore, involves intercepting and collecting all of these calls. However, certain access paths may be infeasible or undesirable to monitor, intercept and collect. In particular circumstances, interception and substantive analysis of the access attempt, such as a SQL database access request, may be overly intrusive. For example, certain calls may require modifications at a low level of the operating system (e.g. kernel changes) in order to be effective. Such changes may trigger substantial regressive testing and/or present a risk of leaving the server in an inconsistent state, for example. Generally, different operating systems present different issues for aggregately catching all IPC call to provide complete coverage.

In further detail, the method of providing nonintrusive database security as disclosed herein includes identifying a plurality of access mediums operable to provide local access to a database via access attempts from a user, and enumerating, for each of the identified access mediums, an access control mechanism operable to limit access attempts via the access medium. The enumeration may take the form of a configuration file or matrix, for example, listing the available IPC access mediums. The method applies, to each of the identified access mediums, the enumerated access control mechanism, such that each of the enumerated access control mechanisms is applicable to a subset of the identified access mediums on the server. The enumeration lists, or covers, each available IPC mechanism to identify access mediums for all access permutations on a particular local server, and the enumeration involves collectively covering all access permutations through which access attempts emanate on the particular local server. The database server then identifies local access attempts to the database via the enumerated access mediums, and restricts local access by performing at least one of preventing the access attempt and reporting (intercepting) the access attempt for further analysis, depending on the enumerated entry for the particular access medium. It should be noted that the local access refers to the client employed for database access, not necessarily the disposition of the user/querying device. In other words, the local access is meant to encompass access which may not be detected by remote parsing or stream based interrogation of an incoming network connection.

In the exemplary configuration, enumerating the access mediums includes determining if the access medium is responsive to an interceptor operable to retrieve and analyze access attempts made via the access medium. Applying access control includes intercepting, if the access medium is responsive to the interceptor, the access attempt for selective access analysis, and preventing, if the access medium is not responsive to the interceptor, access attempts via the enumerated access medium. The identification of access mediums, therefore, includes identifying access mediums which are not interceptable, and preventing access via the particular access medium for each of the access mediums which are not interceptable. Prevention of access, as discussed further below, may include simply monitoring/recording the access attempt, and also blocking the attempt via process termination or otherwise, depending on the configuration.

During operation of the monitored server, application of access control further includes eliminating a potential threat from each of the enumerated access mediums by either intercepting the access attempts made via the enumerated access medium, or preventing usage of the enumerated access medium. Therefore, applying the enumerated access control mechanism to the access attempts further includes collecting access attempts for analysis, either blocking or enumerating (recording) the access attempts, and transmitting the collected access attempts to a collector for substantive analysis.

In particular configurations, to prevent unauthorized and unrecordable database access attempts, the method for preventing unauthorized access to a database includes identifying a plurality of access mediums to a protected database, and enumerating access mediums responsive to an interrogative process, in which the interrogative process is operable to intercept access attempts via the enumerated access mediums. An enforcer process or other termination mechanism then blocks access from access mediums nonresponsive to an interrogative process by prohibiting all activity via the nonresponsive access mediums.

Alternate configurations of the invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
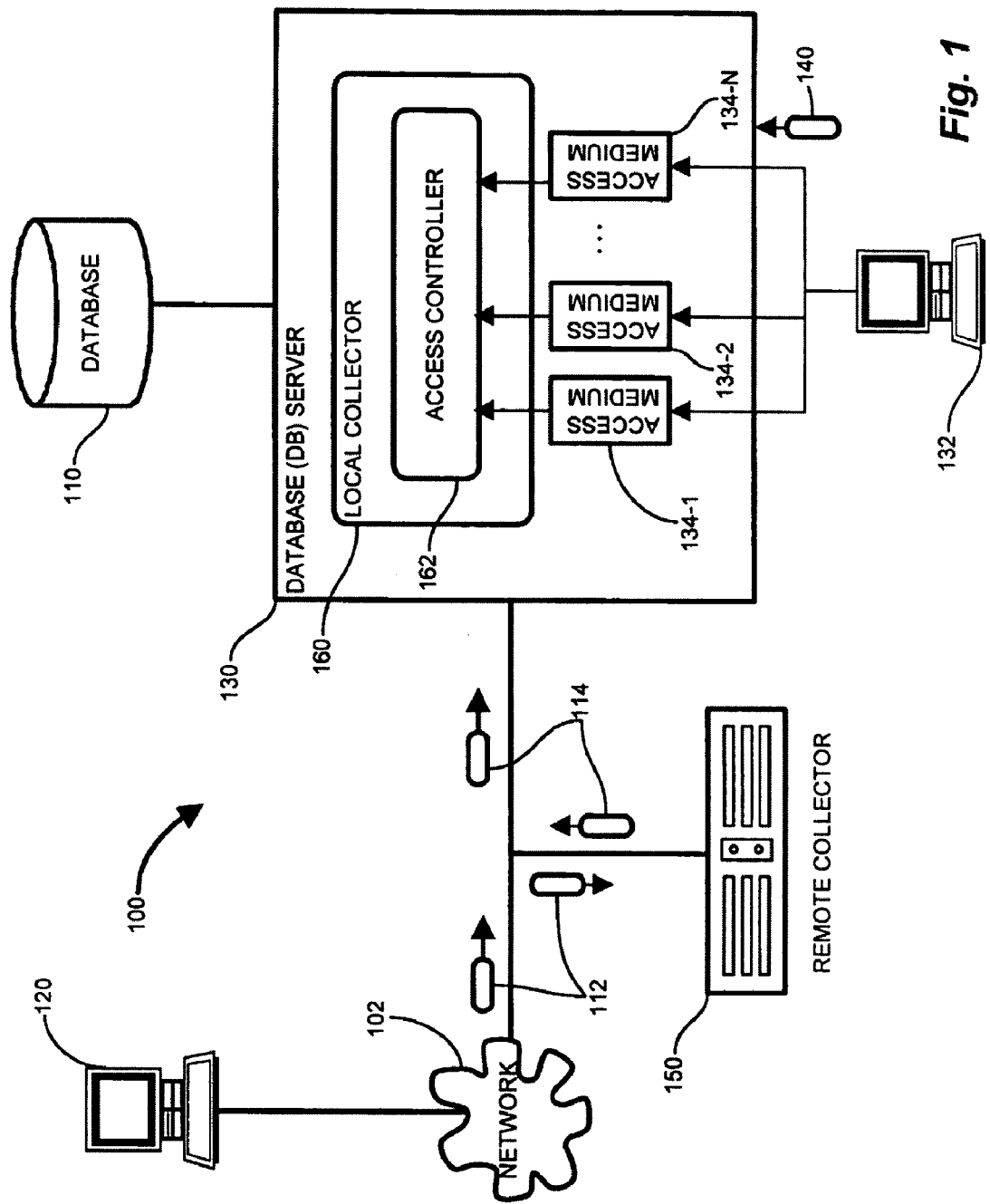
FIG. 1 is a context diagram of an exemplary managed information environment suitable for use with the present invention.

Configurations of the invention in the exemplary arrangement discussed herein provide a local nonintrusive DB access monitoring mechanism that complements a remote access nonintrusive monitoring mechanism for protecting the database. The local monitoring mechanism monitors database access attempts performed on the local server, as opposed to remote access via a network connected to the database server. Local access monitoring and control is achieved by accessing the interprocess communication mechanism (IPC) employed by the operating system (OS) for local access to the database. Typically, the IPC mechanism employs file structures or shared memory via system calls to the operating system from the requesting processes. Monitoring and/or analyzing these requests involves intercepting and collecting these system service calls. The nonintrusive access monitoring application may then perform substantive analysis.

Since typical operating systems often have multiple IPC mechanisms, local protection involves intercepting and collecting each of these calls. However, certain access paths may be infeasible or undesirable to monitor, intercept and collect. In particular circumstances, interception and substantive analysis of the access attempt, such as a SQL database access request, may be overly intrusive. For example, certain calls may require modifications at a low level of the operating system (e.g. kernel changes) in order to be effective. Such changes may trigger substantial regressive testing and/or present a risk of leaving the server in an inconsistent state, for example. Configurations discussed herein provide a hybrid coverage approach to identifying access paths, or mechanisms and either block or intercept access attempts. In this manner, access mediums, such as IPC system calls, which may be efficiently intercepted and analyzed are substantively captured and processed, while other access mediums that are excessively burdensome or intrusive to capture are unselectively blocked from any communication, avoiding the need to substantively analyze such access attempts.

As indicated above, the characterization of access attempts as local and remote refers to the database client employed for such access. As defined below, an access medium is a mechanism by which database access may be sought and for which a protection mechanism may be applied. Configurations discussed herein apply different protection mechanisms to certain access mediums, depending, inter alia, on whether a local or remote database client is employed. Other variations and arrangements of the access mediums will be apparent to those of skill in the art. Accordingly, an access medium is intended to denote a particular virtual or physical access path to the database for which protections and access control may be applied.

In further detail, while the term "local access" may suggest console access whereas remote implies that the user/operator is sitting on another node, such generalizations may be inaccurate. One particular distinguishing feature is where the database client is run. For example, if a user at a workstation uses SSH to log into the host hosting the database server and run a database access tool there, such operation is local access as well. Certain arrangements may not reliably intercept such access on the network for a variety of reasons. One is encryption—e.g. SSH encrypts all the network connection. The second is that the protocols are not always textual—e.g. certain applications and message formats pass bitmaps and events which are not amenable to parsing a text based SQL extract for substantive analysis. Other variations and abstractions of the message transport which dilute the local/remote distinction will be apparent. Accordingly, it is one feature of the exemplary configuration to selectively analyze and monitor particular access mediums, rather than exclusively remote and/or local access. The local/remote configuration of the exemplary system is intended as illustrative only, and is not intended to limit the configurations discussed herein.

In the case of IPC mechanisms which are overly intrusive to monitor, therefore, it is beneficial to prohibit communication via the access mediums providing the access paths. Often, IPC communication may be effectively blocked or prevented more discretely than substantively intercepting and analyzing the substance of the communication. Therefore, if the intrusiveness of intercepting access attempts via a particular access medium outweighs the need or utility of the access medium, it may be more beneficial to block access via the access medium. This approach balances the intrusiveness of the interception with the likelihood or convenience of permitting access the access medium. In this manner, by either interception or prevention of all available access mediums for a particular server device, complete coverage of access points into a database or other protected resource may be achieved.

FIG. 1 is a context diagram of an exemplary managed information environment suitable for use with the present invention. Referring to FIG. 1, the managed information environment 100 includes a database 110 accessible to a plurality of remote users 120 via a database server 130 (server). The remote users 120 access the database 110 via a network 102, such as the Internet or other public or private remote access mechanism. In such a database environment 100, it is desirable to monitor and/or limit access to the database 110 to avoid compromising the data stored within by the threat of unauthorized access. A remote collector 150 nonintrusively intercepts remote transaction requests 112 for analysis, and allows cleared transactions 114 to proceed to the database server 130.

As indicated above, local access to the database 110 is also available to a local user 132 via local access mediums 134-1 . . . 134-N (134, generally). Local access may involve database operators or maintainers (e.g. DBAs) having privileged accounts, or simply local users who do not need network access. In either case, the local access mediums 134 may present a potential bypass to the scrutiny provided by the remote collector 150. In the exemplary configuration, the local access mediums are an interprocess communication mechanism (IPC) employed by the operating system (OS) of the server 130. Typically such IPC mechanisms include shared memory, file structured devices, Unix sockets, named pipes, and other suitable mechanisms. Alternatively, other mechanisms for detecting and intercepting DB access attempts, such as employing database auditing and access tracking tools. Accordingly, configurations discussed herein provide a local collector 160 having an access controller 162 for monitoring the local access mediums 134. The local collector 160 is operable to intercept and analyze the local IPC mechanisms. The local collector 160, therefore, scrutinizes the local access mediums 134 for complementing the monitoring, oversight, and access control capabilities afforded by the remote collector 150.

Figure 2:
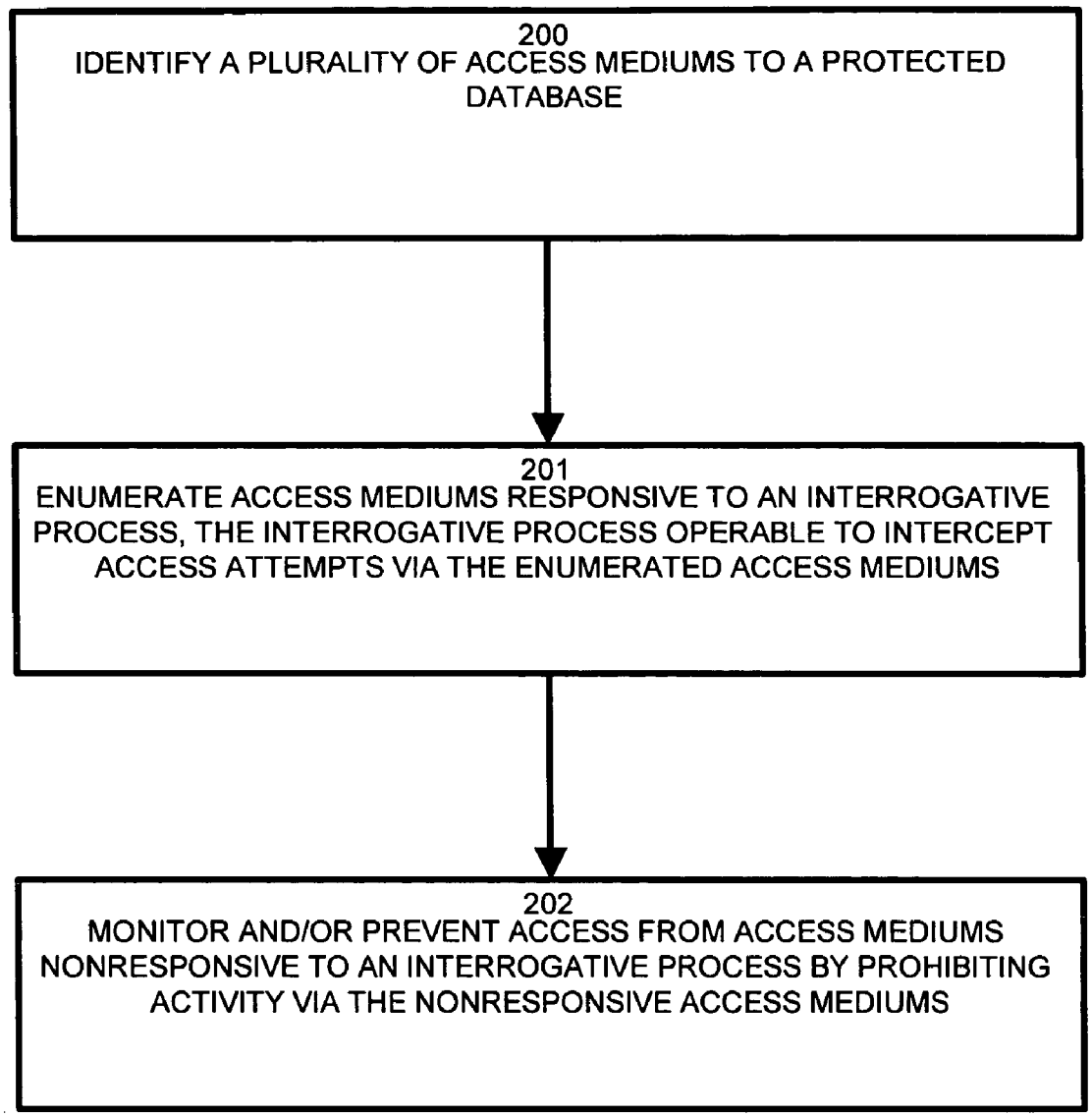
FIG. 2 is a flowchart of monitoring and selectively restricting local database access in the environment of FIG. 1.

FIG. 2 is a flowchart of monitoring and selectively restricting local database access in the environment of FIG. 1. Referring to FIG. 2, the method for preventing unauthorized access to a database as disclosed herein includes, at step 200, identifying a plurality of access mediums 134 to a protected database 110. The access mediums 134 are mechanisms for accessing the database 110 from the local server 130, such as by a local login (e.g. DBA). In the exemplary configuration, the access mediums 134 are interprocess communication (IPC) mechanisms supported by the OS running on the server 130. In such a configuration, network 102 access protection applied to database access attempts 112 via the network 102 may be circumvented through local access via the access mediums 134. The access controller 162 monitors and prevents unauthorized access attempts made via the local access mediums 134.

At step 201, the access controller 162 enumerates access mediums 134 that are responsive to an interrogative process, such that the interrogative process is operable to intercept access attempts via the enumerated access mediums 134. The access mediums 134 may be enumerated in a table, including entries specific to the OS, that includes the available IPC mechanisms providing the access mediums 134. For each access medium 134, the table lists those that may be intercepted (i.e. are interceptable) for monitoring and analysis. If a particular access medium 134 cannot effectively be interrogated, i.e. the access attempts cannot be substantively intercepted and collected, then at step 202, the access controller 162 monitors and/or prevents access from access mediums 134 nonresponsive to an interrogative process by either recording or alternatively, simply prohibiting activity via the nonresponsive access mediums. Once detected, subsequent activity is a matter of individual site configuration and policy. Monitoring and enforcing allowed usage patterns may be provided by recording such detected access as a deterrent means. Alternatively, some sites may adopt a prevention and blocking approach. Typically, such blocking includes terminating a process attempting to perform an access attempt via a non-interceptable access medium, as listed in the table. Therefore, the local collector 160 monitors database access attempts by intercepting access attempts through access mediums 134 which are substantively interceptable, records, and optionally disallows any access attempts 140 through access mediums 134 which are deemed not interceptable.

Figure 3:
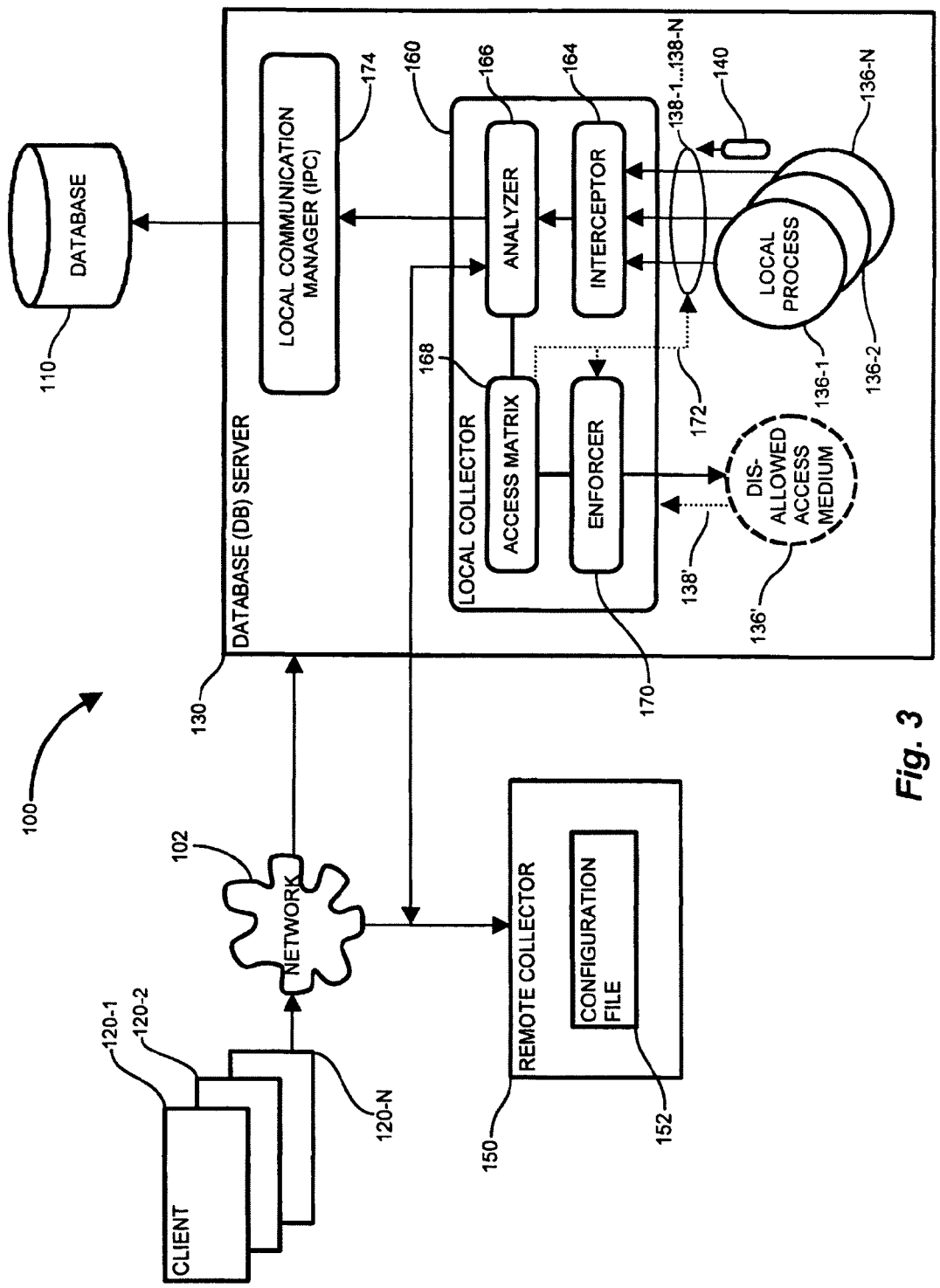
FIG. 3 is a block diagram of an exemplary local database access monitoring mechanism operable according to the method of FIG. 2.

FIG. 3 is a block diagram of an exemplary local database access monitoring mechanism operable according to the flowchart of FIG. 2. Referring to FIGS. 1 and 3, in the exemplary configuration, the local collector 160 includes an interceptor 164, an analyzer 166, an access matrix 168, and an enforcer 170. Local clients 132 employ a local process 136-1..136-N (136 generally) for accessing the database 110 via the IPC access mediums 134 that define access paths 138-1..138-N (138 generally). The interceptor 164 intercedes in the access path 138 from the local processes 136, and captures local access attempts 140 for analysis by the analyzer 166. The analyzer 166 is in communication with the remote collector 150 for providing similar monitoring and analysis capabilities as provided to remote clients 120-1..120-N communicating via the network 102.

The enforcer 170 is operable to monitor all local connections, report on, and optionally, terminate local processes 136' which correspond to disallowed access mediums. Disallowed access mediums 136' are those which the interceptor 164 does not intercede with, due to either performance, stability, or configuration constraints. The enforcer 170 therefore monitors and/or restricts access paths 138' to the database 110 by logging the existence of, and optionally, terminating processes 136' operable to employ such access paths. The access matrix 168, discussed further with respect to FIG. 4 below, indicates, for a particular access medium 134, whether the interceptor 164 or the enforcer 170 is applicable to processes 136, 136' attempting to employ that access medium 134.

A configuration file 152, typically at the remote collector 150, populates the access matrix 168 indicative of which access mediums 134 are covered by the interceptor 164 and the enforcer 170, respectively. Alternatively, the access matrix 168 may take alternate forms of persistency. The access matrix 168 indicates, for the particular operating system in use on the server 130 and for each of the access mediums 134 (i.e. IPC mechanisms), which of the interceptor 164 and enforcer 170 apply. In alternate embodiments, other responsible entities may be designated in the access matrix 168 for monitoring, or covering, other access mediums 134 to the database. For a particular operating system, the access matrix 168 enumerates each applicable access medium 134 (IPC mechanism), and designates either the interceptor 164 to cover the access path 138 employed by that access medium 134 or designates the enforcer 170 to terminate processes 136' that would employ alternate access paths 138' not covered by the interceptor 164. In this manner, complete coverage of all database access paths 138, 138' is afforded by the access matrix 168, as shown by dotted line 172.

For intercepted transactions 140, after passing scrutiny, the analyzer 166 passes them through to the native local communication manager 174 (e.g. IPC mechanism) from which they were intercepted. The analyzer 166 therefore provides equivalent scrutiny as the remote collector 150, as defined further in copending U.S. patent application Ser. No. 10/723,521, filed Nov. 26, 2003, entitled "System and Methods for Nonintrusive Database Security". In the exemplary configuration, the remote collector may include the SQL Guard application, marketed commercially by Guardium, Inc. of Waltham, Mass.

Figure 4:
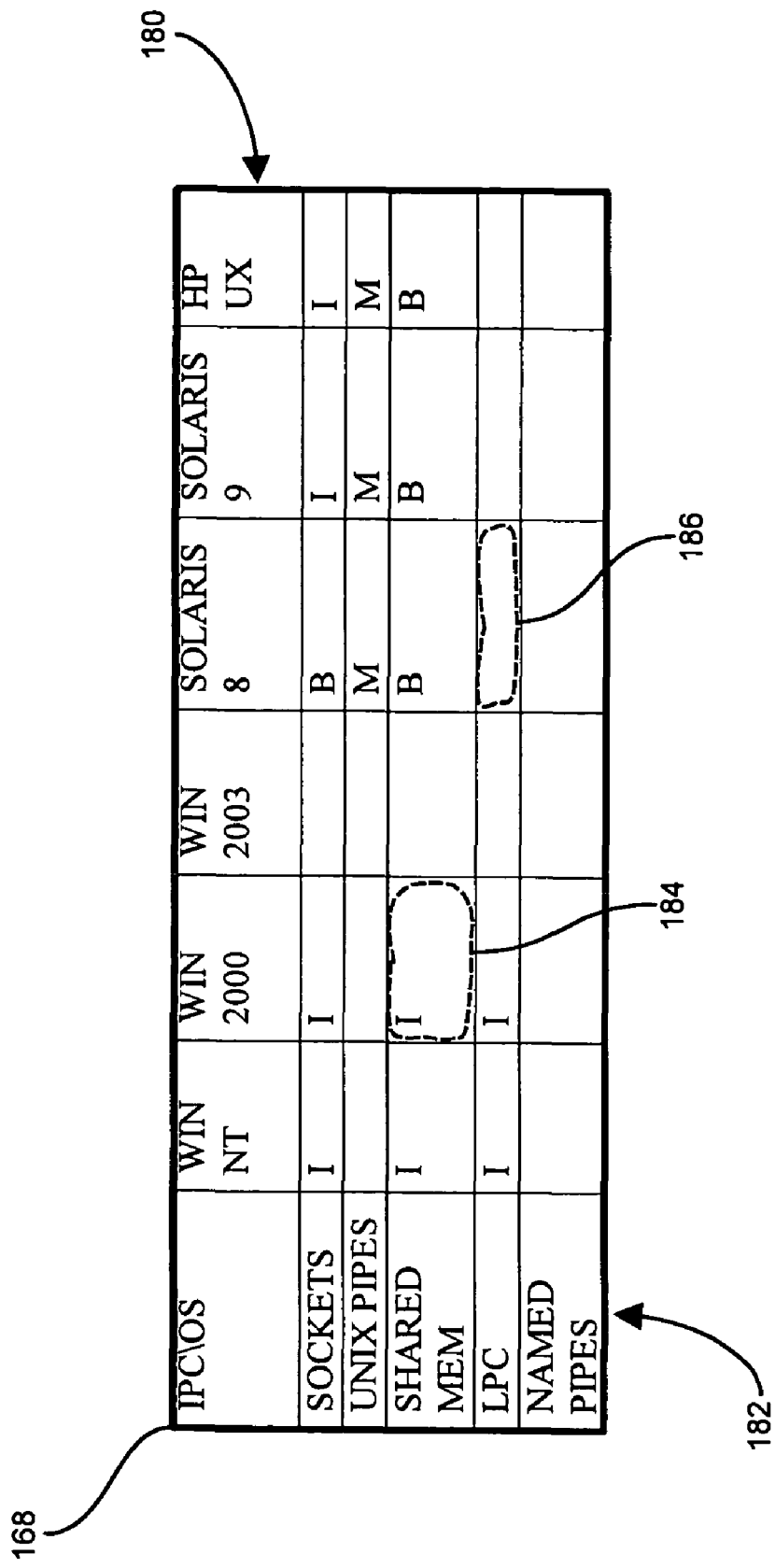
FIG. 4 is an exemplary access matrix in the system of FIG. 3.

FIG. 4 is an exemplary access matrix 168 in the system of FIG. 3. Referring to FIG. 4, the exemplary access matrix 168 indicates, for each operating system and access medium available, the prevention measure to be taken by the local collector 160. Available operating systems are listed across the horizontal axis 180, and the access mediums 182 are listed down the vertical axis. Each entry 184 indicates whether to intercept (I), monitor (M) or block (B) the access medium. Null entries 186 indicate that the access medium is not applicable to the operating system in question. Alternate and additional information, such as alternative blocking mechanisms or interception mechanisms to be employed, may also be listed in the entries 184. As indicated above, for the access mediums 134 for which substantive analysis is not feasible or desirable, monitoring and/or blocking are available. Since such access mediums generally present, in most configurations, a need to know of each usage, monitoring is usually sufficient, although the termination, or blocking, option is still available (along with recording the attempted access). The configuration file 152 populates the access matrix 168 with the prevention information to indicate which prevention measure (monitor, block or intercept) to pursue for each OS/access medium combination.

Figure 5:
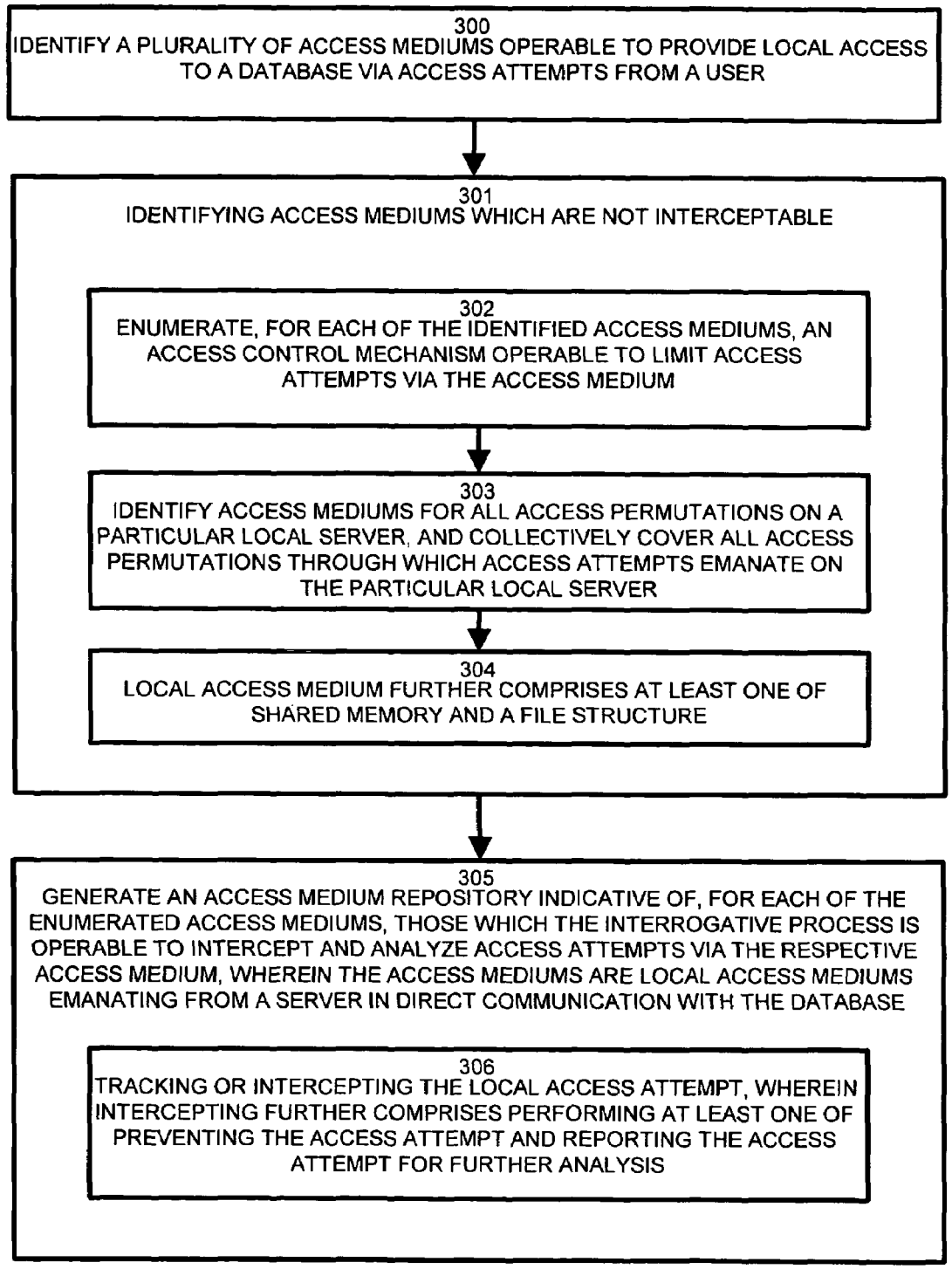
FIG. 5 is a flowchart for identifying and enumerating access attempts suitable for use with the database of FIG. 3.
Figure 6:
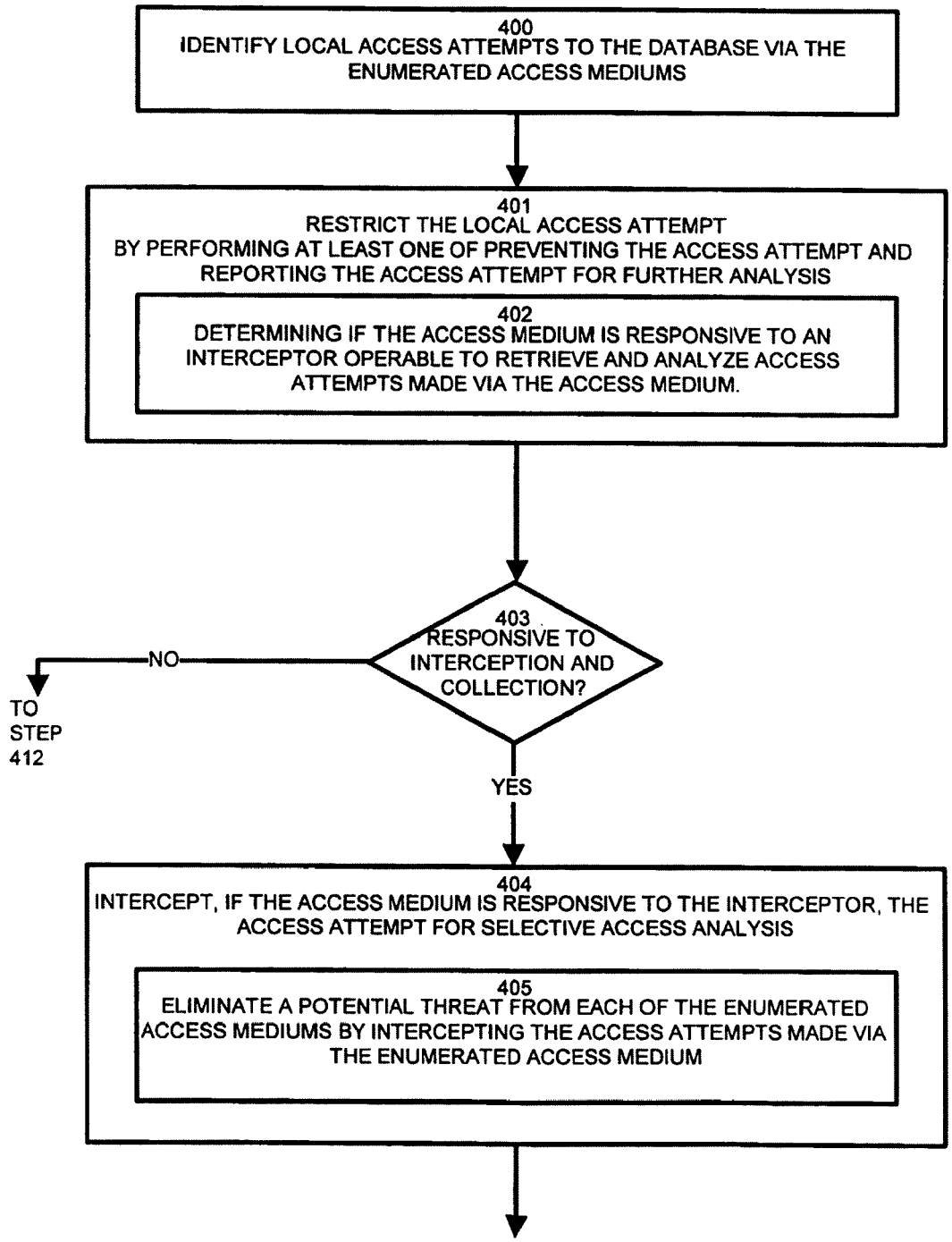
FIGS. 6-9 are a flowchart for monitoring, and controlling access attempts using the access matrix of FIG. 4 generated according to FIG. 5.
Figure 7:
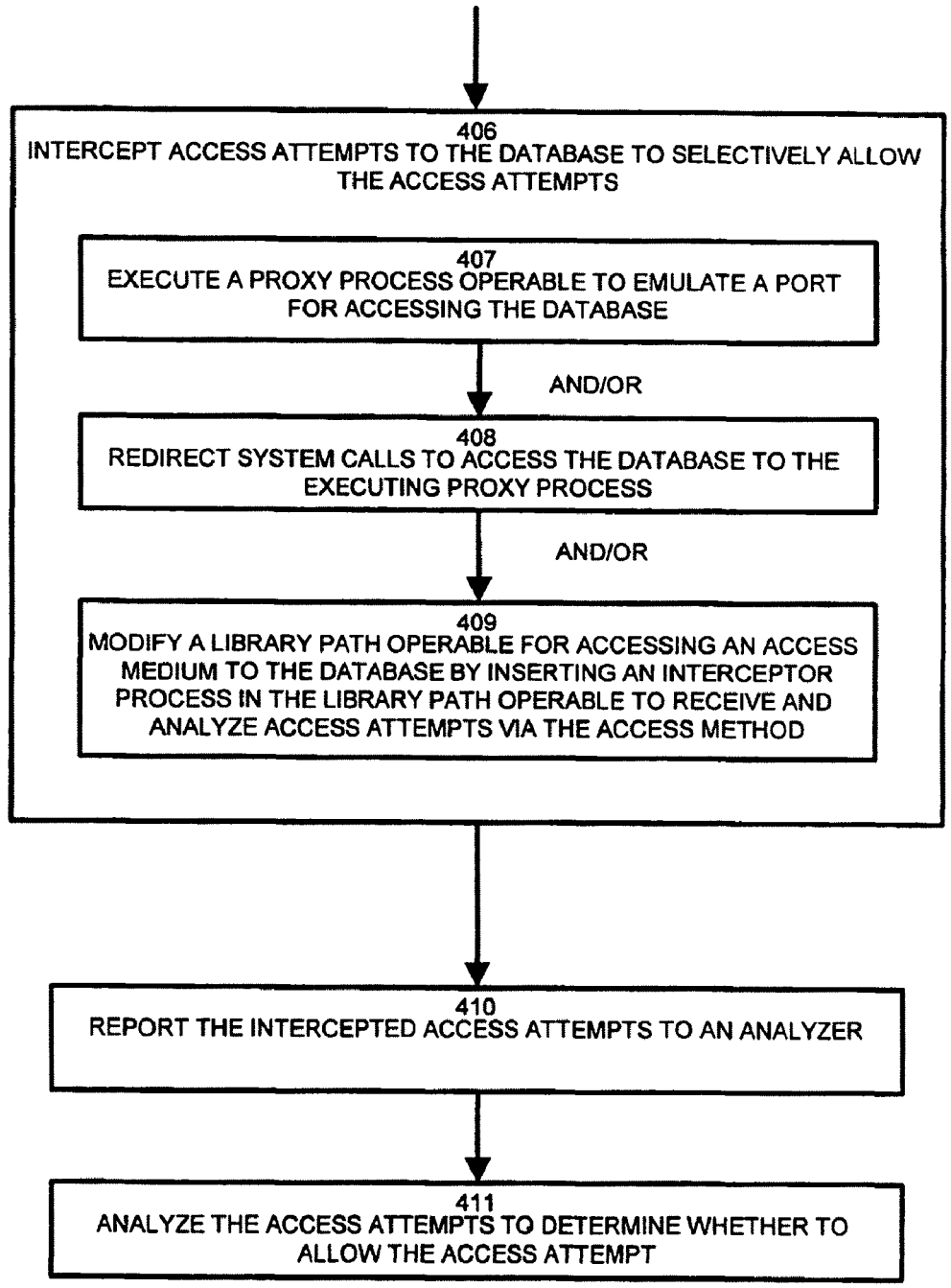
Figure 8:
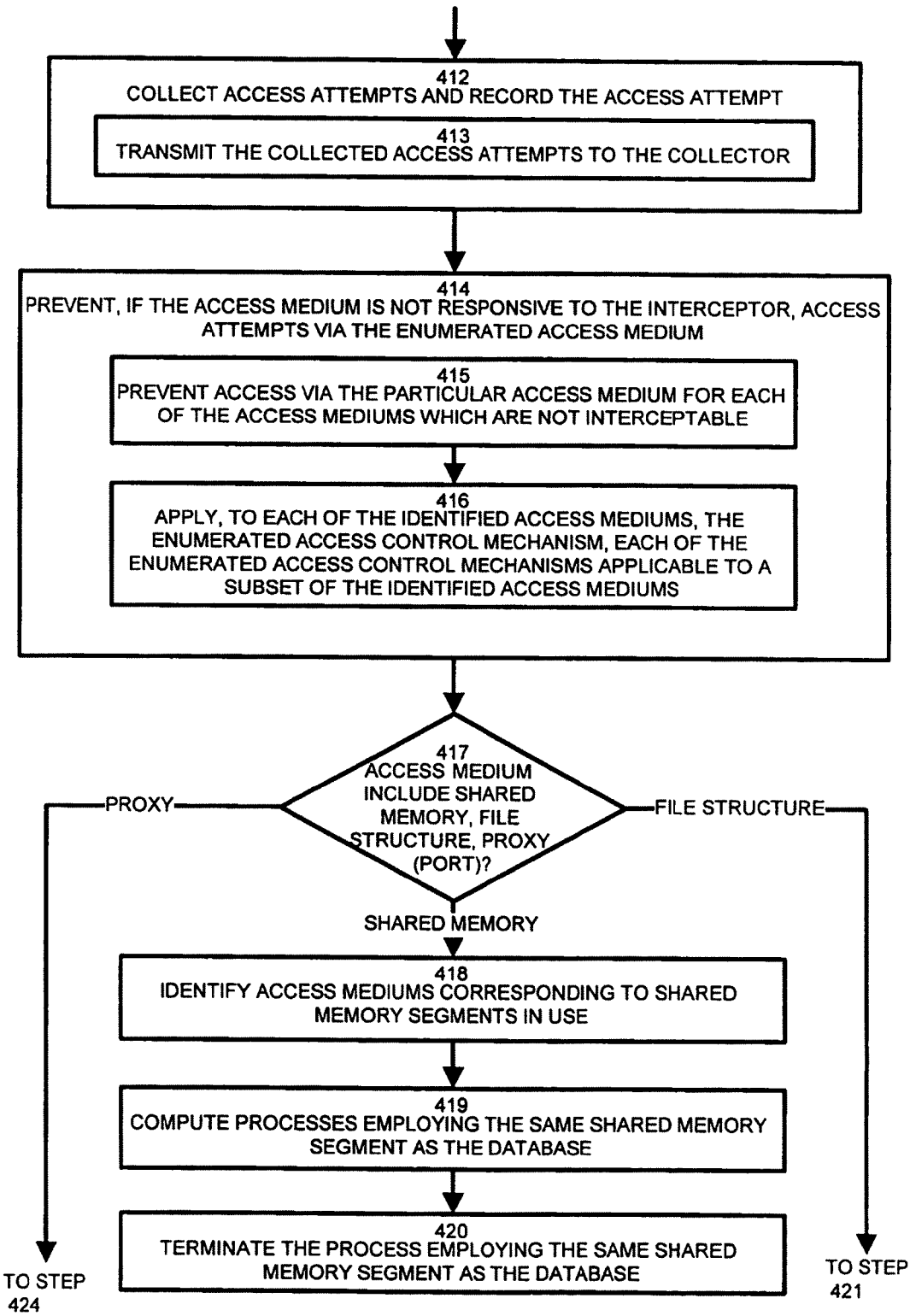
Figure 9:
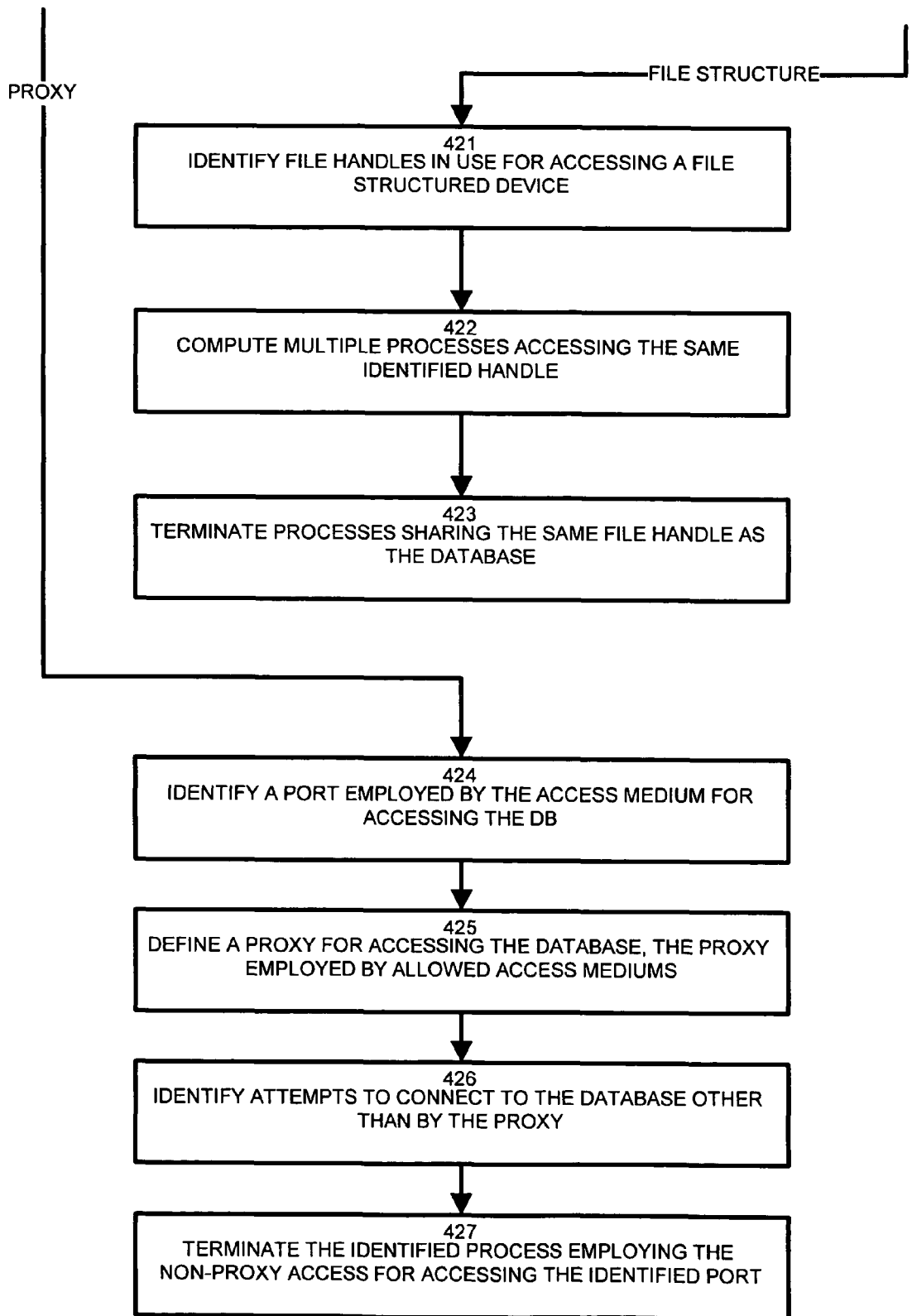

FIG. 5 is a flowchart for identifying and enumerating access attempts for particular access mediums, such as those listed in the table of FIG. 4, suitable for use with the database of FIG. 3. Referring to FIGS. 3 and 5, at step 300, a user, operator or DBA identifies a plurality of access mediums 134 operable to provide local access to a database 110 via access attempts 140 from a user. The identified access mediums 134 cover all available IPC mechanisms, and hence available local access paths, to the database 110. The operator identifies the access mediums 134 which are not interceptable, as depicted at step 301. The non-interceptable access medium may be designated as such because they are overly intrusive to monitor and intercept (i.e. embedded deep within the OS) or because of complexity with race or timing conditions to effectively collect access attempts via the access medium, for example. Other constraints may apply, as well.

In the exemplary configuration, identification includes, enumerating, for each of the identified access mediums 134, an access control mechanism operable to limit access attempts via the access medium 134, as depicted at step 302. If the access medium is deemed not interceptable, then access prevention is the access control mechanism applicable to that access medium. Prevention includes termination of processes attempting to employ the access medium 134, through determinations and mechanisms discussed further below.

At step 303, identifying further includes identifying access mediums for all access permutations on a particular local server 130, and enumerating involves collectively covering all access permutations through which access attempts 134 emanate on the particular local server 130. In the exemplary arrangement, this takes the form of the access matrix 168 of FIG. 4, to enumerate each available access medium 134 for the various operating systems that may be in use. In order to provide maximum monitoring and oversight capabilities for database 110 access attempts, the access matrix 168 covers each available access medium 134 on a particular OS by either intercepting and collecting the access attempts or terminating processes attempting to use the assess medium. In particular configurations, as shown at step 304, the local access mediums 134 include at least one of shared memory and a file structure device as the IPC mechanisms employed as access mediums 134 for accessing the database 110.

The information identifying the access mediums 134 is employed to generate an access medium repository, such as the access matrix 168, indicative of, for each of the enumerated access mediums, those which the interrogative process is operable to intercept and analyze access attempts via the respective access medium, in which the access mediums 134 are local access mediums emanating from the server 130 in direct communication with the database 110, as disclosed at step 305. In the exemplary configuration, the repository takes the form of the access matrix 168, populated from the configuration file 152, that indicates whether the local collector 160 prevents the access attempt or reports, or tracks, the access attempt for further analysis, as depicted at step 306.

FIGS. 6-9 are a flowchart for monitoring, and controlling access attempts using the access matrix of FIG. 4 generated according to the flowchart of FIG. 5. Referring to FIGS. 3-4 and 6-9, at step 400, the local collector 160 identifies local access attempts to the database 110 via the enumerated access mediums listed in the access matrix 168. At step 401, the local collector 160, in response to a request to access the DB 110, restricts the local access attempt 140 by performing at least one of preventing the access attempt and reporting the access attempt for further analysis. Using the access matrix 168, the local collector 160 determines if the access medium 134 being employed is responsive to the interceptor 164 operable to retrieve and analyze access attempts made via the access medium 134, as depicted at step 402. A check is performed, at step 403, to determine if the access medium is responsive to substantive interception and collection. It should be noted that the listing of actions is exemplary, and that typically the intercepted access mediums are established at startup as an ongoing gathering and collection activity, and that the preventative measures (i.e. stopping processes) are responsive to detection of individual access attempts.

Based on the information in the access matrix, the interceptor 164 configures an interception mechanism to intercept, if the access medium 134 is responsive to the interceptor 164, the access attempt 140 for selective access analysis, as shown at step 404, and sends the access attempt 140 to the analyzer 166 for substantive analysis. Therefore, the interceptor 164 applies the information in the access matrix 168 to eliminate a potential threat from each of the enumerated access mediums 134 by intercepting the access attempts 140 made via the enumerated access medium 134, as depicted at step 405.

In intercepting access attempts 140 to the database to selectively allow the access attempts, at step 406, the interceptor 164 employs several mechanisms. At step 407, the interceptor 164 executes a proxy process operable to emulate a port for accessing the database 110. The proxy intercept mechanism inserts a proxy process between the database by resetting the default port used for database access, for example port 1521, used by default for Oracle® databases. The proxy connects to port 1521, and resets the configuration parameter such that other processes connect to the proxy rather then the actual database. The proxy may then scrutinize all access attempts 140 to the database. Further, the enforcer 170, discussed further below, identifies unauthorized access by any process other than the proxy connecting to port 1521. In other words, only the designated proxy is to be connected directly to the database port 1521; other processes that attempt to connect are terminated by the enforcer process 170.

Alternatively, at step 408, intercepting may include redirecting system calls to access the database 110 to the executing proxy process. The operating system call to invoke the access medium (e.g. IPC mechanism) for passing data to the database 110 is modified to reference the proxy. Although effective, this mechanism may trigger regressive testing because of OS modifications, and therefore may not be appropriate for all configurations.

At step 409, the interceptor 164 modifies a library path operable for accessing an access medium 134 to the database 110 by inserting the interceptor 164 process in the library path operable to receive and analyze access attempts via the access medium 134. Such a library path is a prioritized list of objects or directories for resolving a reference, such as the IPC call to access the database 110. Inserting the interceptor 164 prior to the actual database 110 reference ensures that processed employing the library search list will resolve the DB reference in favor of the interceptor 164 before the actual DB 110. This mechanism, however, assumes that the library search path is employed by the scrutinized local process 136.

Once intercepted, by any suitable mechanism, the interceptor 164 reports the intercepted access attempt to the analyzer 166, as shown at step 410. The analyzer 166 then analyzes the access attempt 140 to determine whether to allow the access attempt 140, as shown at step 411. As indicated above, the analyzer 166 is in communication with the remote collector 150 for performing substantive analysis on the intercepted access attempt 140.

From the check at step 403, for the access mediums 134 that are not responsive to the remote collector 150, at step 412, the interceptor 164 collects the access attempts 140 and enumerates (i.e. records) the access attempts. In the exemplary configuration, the analyzer 166 transmits the collected access attempts 140 to the remote collector 150 for similar substantive analysis as the intercepted network 102 access attempts, as depicted at step 413. Alternatively, the analysis may be performed locally by the analyzer 166.

For access mediums 134 which are to be recorded or blocked, the local collector 160 invokes the enforcer 170 to prevent, if the access medium 134 is not responsive to the interceptor 164, access attempts via the enumerated access medium, as shown at step 414. Given the OS in use on the server 130, for each access medium 134 designated in the access matrix as B (block), the enforcer 170 prevents access via the particular access medium 134 for each of the access mediums 134 which are not interceptable, as depicted at step 415. The enforcer 170 therefore applies, to each of the identified access mediums 134, the enumerated access control mechanism indicated in the access matrix 168, such that each the enumerated access control mechanisms applicable to a subset of the identified access mediums 134, as shown at step 416. In the exemplary configuration, the enforcer 170 generally terminates processes of a disallowed access medium 136.' Such processes are those which are operable to access the database 110 other then designated proxies. Alternate configurations may employ other access control mechanisms enumerated in the access matrix 168.

In the exemplary configuration, the enforcer 170 performs a check, as disclosed at step 417, to determine if the disallowed access medium 134 to be prevented is one of either a shared memory operation, a file structure/device based operation, or a proxy operation. In the case of shared memory, at step 418, the enforcer 170 identifies access mediums corresponding to shared memory segments in use. Typically this involves querying the operating system for a list of shared memory segments and corresponding processes accessing them. The enforcer computes processes that are employing the same shared memory segment as the database 110, as shown at step 419, such as through a matching operation on the list of shared memory segments to identify processes accessing a common shared memory segment. The enforcer 170 then identifies, logs and/or terminates the process 136' computed to be employing the same shared memory segment as the database 110, as depicted at step 420.

If, at step 417, a file structure device is employed as the access method, than at step 421 the enforcer identifies file handles in use for accessing a file structured device. In many operating systems, several types of IPC communications are handled via a file descriptor. Often, the file descriptors in use are readily obtained via an OS call. For example, Unix systems typically employ file descriptors for all but shared memory IPC transfers. Accordingly, communicating processes are identifiable by listing file descriptors and identifying processes accessing a common file descriptor. For example, the Unix List Open Files call (LSOF) may be employed to identify file handles in use. Other mechanisms will be apparent. Therefore, the enforcer 170 computes multiple processes accessing the same identified file handle, as shown at step 422, and at step 423, and records/terminates processes sharing the same file handle as the database 110.

At step 424, in the case of proxy access to the database, the enforcer 170 identifies a port employed by the access medium 134 for accessing the DB 110. The enforcer 170 determines a defined proxy for accessing the database, such that the proxy is employed by allowed access mediums 134, as depicted at step 425. As indicated above with respect to intercepted access, the proxy is the only designated allowable access point (e.g. process) to the database 110. Accordingly, accesses to the database by any other than the designated proxy, are disallowed. Accordingly, at step 426 the enforcer 170 identifies attempts to connect to the database other than by the proxy, and terminates the identified process 136' employing the non-proxy access for accessing the identified port or other access path into the database 110, as depicted at step 427.

In alternate configurations, utilities or tools targeting the DB may be employed. For example, database auditing tools and access tracking utilities provide yet another way (which uses the database) to track connections to the DB. In such configurations, the interceptor employs database auditing features to collect all login/logout operations, and then correlates this with intercepted data; anything that is a delta means that it was a "rogue connection" (i.e. potentially unauthorized).

Those skilled in the art should readily appreciate that the programs and methods for monitoring and selectively analyzing and preventing database access as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for monitoring and selectively analyzing and preventing database access has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of providing nonintrusive database security comprising:
    identifying a plurality of access mediums operable to provide local access to a database in response to access attempts from a user, the identified access mediums including local access mediums emanating from a local server, the local server in direct communication with the database;
    enumerating, for each of the identified access mediums, an access control mechanism operable to limit access attempts made via the access medium, and enumerating comprising covering all access attempts to the database emanating on the local server;
    identifying local access attempts to the database made via the enumerated access mediums, the local access attempts employing a local client for database access, the local client defined by a local process independent of a disposition of an initiating user query device;
    applying, to each of the identified access mediums, the enumerated access control mechanism, each of the enumerated access control mechanisms applicable to a subset of the identified access mediums; and
    restricting the identified local access attempt made via the access medium in accordance with the enumerated control mechanism for that access medium, restricting further comprising performing at least one of preventing the access medium from making the access attempt in response to that access medium not being interceptable and reporting the access attempt made via the access medium for further analysis.

2. The method of claim 1 wherein enumerating further comprises:
    determining if the access medium is responsive to an interceptor operable to retrieve and analyze access attempts made via the access medium.

3. The method of claim 2 wherein applying further comprises:
  intercepting, if the access medium is responsive to the interceptor, the access attempt for selective access analysis; and
  preventing, if the access medium is not responsive to the interceptor, access attempts via the enumerated access medium.

4. The method of claim 3 wherein preventing further comprises:
  identifying access mediums which are not interceptable; and
  preventing access for each of the access mediums which are not interceptable.

5. The method of claim 1 wherein applying further comprises eliminating a potential threat from each of the enumerated access mediums by at least one of
  intercepting access attempts made via the enumerated access medium; and
  preventing usage of the enumerated access medium.

6. The method of claim 1 wherein applying the enumerated access control mechanism further comprises:
  collecting access attempts and either blocking or enumerating the access attempts; and
  transmitting the collected access attempts to a collector.

7. The method of claim 1 wherein the identified access mediums include local access mediums and remote access mediums, the local access mediums defined by interprocess communication mechanisms that initiate and terminate on the local server.

8. The method of claim 1 wherein the local access mediums define a virtual or physical path to the local server, the local server accessing interprocess communication mechanisms employed by an operating system for local access to the database.

9. The method of claim 1 wherein the local access attempts invoke an access medium defined by an IPC mechanism on the local server, the local access attempt initiated by a proximate user, the proximate user achieving access via a local device such that the local device circumvents a perimeter security approach.

10. The method of claim 1 wherein the access mediums include at least one of shared memory, Unix sockets, pipes, file handles, Windows LPC and Named pipes.

11. The method of claim 1 wherein local accesses are intercepted by interceding in an access path defined by an access medium from local processes.

12. The method of claim 11 wherein the local accesses are undetectable by remote parsing or stream based interrogation of an incoming network connection.

13. The method of claim 1 wherein identifying the plurality of access mediums further comprises defining a hybrid coverage approach which either blocks or intercepts access attempts, the hybrid coverage performing, for the identified access mediums, at least one of:
  capturing and processing access mediums which may be intercepted; and
  unselectively blocking access mediums which cannot be intercepted, such that a need for capture and analysis is avoided.

14. The method of claim 13 further comprising, if an access medium is determined non-interceptable, blocking disallowed access mediums for which scrutinized access is not attainable.

15. The method of claim 14 wherein enumerating the access mediums further comprises storing an access matrix denoting each access medium as interceptable and non interceptable, and intercepting or terminating affected processes.

16. A method for preventing unauthorized access to a database comprising:
  identifying a plurality of access mediums to a protected database, the identified access mediums including local access mediums emanating from a local server, the local server in direct communication with the database;
  determining access mediums responsive to an interrogative process and enumerating access mediums responsive to the interrogative process, the interrogative process operable to intercept access attempts made via the enumerated access mediums;
  generating an access medium repository, wherein, for each of the enumerated access mediums, the access medium repository indicates the access mediums which the interrogative process is operable to intercept and analyze access attempts made via the respective access medium, wherein the access mediums are local access mediums emanating from a local server in direct communication with the database, the local access mediums defined by interprocess communication mechanisms emanating and terminating on the local server; and
  blocking access to the protected database from access mediums nonresponsive to the interrogative process by prohibiting activity conducted via the nonresponsive access mediums.

17. The method of claim 16 further comprising:
  identifying local access attempts to the database via the enumerated access mediums; and
  intercepting the local access attempt, wherein intercepting further comprises performing at least one of preventing the access attempt and reporting the access attempt for further analysis.

18. The method of claim 17 further comprising:
  intercepting access attempts to the database to selectively allow the access attempts;
  reporting the intercepted access attempts to an analyzer; and
  analyzing the access attempts to determine whether to allow the access attempt.

19. The method of claim 17 wherein the local access medium further comprises at least one of shared memory and a file structure.

20. The method of claim 19 further comprising:
  identifying file handles in use for accessing a file structured device;
  computing multiple processes accessing the same identified handle; and
  terminating processes sharing the same file handle as the database.

21. The method of claim 19 further comprising:
  identifying access mediums corresponding to shared memory segments in use;
  computing processes employing the same shared memory segment as the database; and
  terminating the computed process employing the same shared memory segment as the database.

22. The method of claim 19 further comprising modifying a library path operable for accessing an access method to the database by inserting an interceptor process in the library path operable to receive and analyze access attempts via the access method.

23. The method of claim 17 further comprising:
identifying a set of database login attempts for a particular period;
gathering reported logins collected from a particular access medium; and
comparing the identified database login attempts with the gathered logins to identify discrepancies indicative of potentially suspect login attempts.

24. A method of tracking database access comprising:
enumerating access mediums providing local access to a database via a local server, the enumerated access mediums including local access mediums emanating from the local server, the local server in direct communication with the database;
determining, for each of the enumerated access mediums, whether access attempts are interceptable for each particular access medium for retrieval and analysis of the access attempts
identifying local access attempts to the database made via the enumerated access mediums, the local access attempts occurring via interprocess communication mechanisms emanating and terminating on the local server,
collecting, for each of the interceptable access attempts, the access attempt; and
preventing access to the database for each of the access mediums which are not interceptable, preventing further comprising performing at least one of preventing the access attempt and reporting the access attempt for further analysis.

25. A server for monitoring database access comprising:
a processor;
a memory coupled to the processor;
a first process for intercepting database access attempts;
a second process for preventing database access attempts, the first process and the second process executable in the memory by the processor;
an enumeration of available access mediums, each of the enumerated access mediums responsive to at least one of the first process and the second process to limit access attempts made on that access medium, the enumerated access mediums including local access mediums emanating from the local server, the local server in direct communication with the database, and the enumeration covering all access attempts to the database emanating on the local server; and
an access controller for identifying local access attempts made via the local access mediums and employing the enumeration to determine applicability of the first and second process, and further for invoking at least one of the first and second processes for limiting the local access attempt made via the access medium, the local access attempts occurring via interprocess communication mechanisms emanating and terminating on the local server, the access controller further restricting the identified access attempt, restricting further comprising performing at least one of preventing the local access attempt made via the access medium in response to that access medium not being interceptable and reporting the local access attempt made via the access medium for further analysis.

26. The server of claim 25 wherein the enumeration is an access matrix adapted to indicate if the access medium is responsive to the first process, the first process further operable to retrieve and analyze access attempts made via the access medium.

27. The server of claim 26 wherein the first and second processes are responsive to the access controller for:
intercepting, if the access medium is responsive to the first process, the access attempt for selective access analysis; and
preventing, if the access medium is not responsive to the first process, access attempts via the enumerated access medium.

28. The server of claim 27 wherein the access controller:
identifies access mediums which are not interceptable; and
prevents access via the particular access medium for each of the access mediums which are not interceptable.

29. The server of claim 25 wherein the access controller eliminates a potential threat from each of the enumerated access mediums by at least one of:
intercepting the access attempts made via the enumerated access medium; and
preventing usage of the enumerated access medium.

30. A computer program product having a computer readable storage medium operable to store computer program logic embodied in computer program code encoded thereon that, when executed by a processor, cause the computer to perform a method for providing local database security, the method comprising:
identifying a plurality of access mediums operable to provide local access to a database via access attempts from a user, the identified access mediums including local access mediums emanating from a local server, the local server in direct communication with a database;
enumerating, for each of the identified access mediums, an access control mechanism operable to limit access attempts made via the access medium, and enumerating comprising covering all access attempts to the database emanating on the local server;
identifying local access attempts to the database via the enumerated access mediums, the local access attempts occurring via interprocess communication mechanisms emanating and terminating on the local server;
applying, to each of the identified access mediums, the enumerated access control mechanism, each of the enumerated access control mechanisms applicable to a subset of the identified access mediums, applying the enumerated access control mechanism to the access attempts further including:
collecting access attempts made via the access medium and either blocking the access medium in response to that access medium not being interceptable or recording the access attempts; and
transmitting the recorded access attempts to a collector operable to analyze the collected access attempts.

31. A method of providing nonintrusive database security comprising:
identifying a plurality of access mediums operable to provide local access to a database via access attempts from a user, the identified access mediums including local access mediums emanating from a local server, the local server in direct communication with the database;
enumerating, for each of the identified access mediums, an access control mechanism operable to limit access attempts made via the access medium, each access medium having a corresponding prevention measure, and enumerating comprising covering all access attempts to the database emanating on the local server;
generating, from a configuration file, an access matrix having an entry for each of a combination of operating systems and local access mediums, the access matrix indicating the corresponding prevention measure to be invoked for each combination, the local access mediums defined by interprocess communication mechanisms emanating and terminating on the local server;

indexing the access matrix based on the local access medium and the operating system; and applying, to each of the identified access mediums, the enumerated access control mechanism to limit access attempts made via the access medium, each of the enumerated access control mechanisms applicable to a subset of the identified access mediums, limiting further comprising performing at least one of preventing the access attempt made via the access medium in response to that access medium not being interceptable and reporting the access attempt made via the access medium for further analysis.

\* \* \* \* \*